(12) United States Patent
Chouinard et al.

(10) Patent No.: US 11,882,848 B1
(45) Date of Patent: Jan. 30, 2024

(54) CALORIE-REDUCED CHOCOLATE PRODUCT COMPRISING HYDRATED DIETARY FIBER AND METHODS FOR PRODUCING SAME

(71) Applicant: Calowry Inc., Lethbridge (CA)

(72) Inventors: Hal Pio Chouinard, Lethbridge (CA); Glenn Coulter, Lethbridge (CA); Kate Irene Wilson, Lethbridge (CA)

(73) Assignee: Calowry Inc., Lethbridge (CA)

( * ) Notice: Subject to any disclaimer, the term of this patent is extended or adjusted under 35 U.S.C. 154(b) by 0 days.

(21) Appl. No.: 18/156,263

(22) Filed: Jan. 18, 2023

Related U.S. Application Data (60) Provisional application No. 63/430,258, filed on Dec. 5, 2022, provisional application No. 63/425,186, filed on Nov. 14, 2022.

(51) Int. Cl.
*A23G 1/40* (2006.01)
*A23G 1/00* (2006.01)
*A23L 33/28* (2016.01)

(52) U.S. Cl.
CPC .............. *A23G 1/40* (2013.01); *A23G 1/0006* (2013.01); *A23G 1/0026* (2013.01); *A23L 33/28* (2016.08)

(58) Field of Classification Search
None
See application file for complete search history.

(56) References Cited

U.S. PATENT DOCUMENTS

| | | | |
|---|---|---|---|
| 4,812,445 A | 3/1989 | Eden et al. | |
| 5,965,179 A * | 10/1999 | Ducret | A23G 1/325 426/573 |
| 6,669,962 B2 | 12/2003 | Fanta et al. | |
| 8,377,492 B2 | 2/2013 | Nishibata et al. | |
| 2003/0059458 A1 | 3/2003 | Haber et al. | |
| 2006/0003070 A1 | 1/2006 | Muller-Thym, Jr. | |
| 2006/0141101 A1 | 6/2006 | Chen et al. | |
| 2009/0285964 A1 * | 11/2009 | Shepley | A23L 33/21 426/631 |
| 2010/0303991 A1 | 12/2010 | Karwowski et al. | |

FOREIGN PATENT DOCUMENTS

| | | | |
|---|---|---|---|
| CA | 1 142 387 A | 3/1983 | |
| CA | 2 309 171 A1 | 5/1999 | |
| CA | 2 708 008 A1 | 6/2009 | |
| CN | 105747201 A | 7/2016 | |
| EP | 0 552 478 B1 | 7/1993 | |
| EP | 2 371 374 A1 | 10/2011 | |
| EP | 1 608 236 B1 | 11/2014 | |
| WO | WO-2012168882 A1 * | 12/2012 | ........... A23D 7/0053 |
| WO | WO 2016/023923 A1 | 2/2016 | |
| WO | WO 2018/081900 A1 | 5/2018 | |
| WO | WO 2021/068056 A1 | 4/2021 | |
| WO | WO 2021/127787 A1 | 7/2021 | |

OTHER PUBLICATIONS

Dupont Avicel RC-591 product sheet (Year: 2020).*
Dupont Avicel RC-591 product sheet (Year: 2020) (Year: 2020).*
Elelments of chocolate, Tempering chocolate by Corriher—Published in 2007 (Year: 2007).*
Besbes, et al. "Partial Replacement of Meat by Pea Fiber and Wheat Fiber: Effect on the Chemical Composition, Cooking Characteristics and Sensory Properties of Beef Burgers." Journal of Food Quality 31.4 (2008): 480-489.
Hughes, et al. "Effects of Fat Level, Oat Fibre and Carrageenan on Frankfurters Formulated with 5, 12 and 30% Fat." Meat Science 45.3 (1997): 273-281.
Kerr, et al. "Physical and Sensory Characteristics of Low-fat Italian Sausage Prepared with Hydrated Oat." Journal of Food Quality 28.1 (2005): 62-77.
Khanvilkar, et al. "Carrier Materials for Encapsulation of Bio-active Components of Food." International Journal of Pharmaceutical Sciences Review and Research 40.1 (2016): 62-73.
Lacerda, et al. "Starch, inulin and maltodextrin as encapsulating agents affect the quality and stability of jussara pulp microparticles." Carbohydrate Polymers 151 (2016): 500-510.
Mansour, et al. "Characteristics of low-fat beefburgers as influenced by various types of wheat fibres." Journal of the Science of Food and Agriculture 79.4 (1999): 493-498.
Soma, at al. "Advancements in non-starch polysaccharides research for frozen foods and microencapsulation of probiotics." Frontiers of Chemical Engineering in China 3.4 (2009): 413-426.
Talukder, Suman. "Effect of Dietary Fiber on Properties and Acceptance of Meat Products: A Review." Critical Reviews in Food Science and Nutrition 55.7 (2015): 1005-1011.
Yang, et al. "Modification and Application of Dietary Fiber in Foods." Journal of Chemistry 2017 (2017).

* cited by examiner

*Primary Examiner* — Jyoti Chawla
(74) *Attorney, Agent, or Firm* — Knobbe Martens Olson & Bear LLP (57) ABSTRACT

There is provided a calorie-reduced chocolate product comprising insoluble dietary fiber and at least 5% water. Also provided are methods for making the same.

21 Claims, 6 Drawing Sheets

CALORIE-REDUCED CHOCOLATE PRODUCT COMPRISING HYDRATED DIETARY FIBER AND METHODS FOR PRODUCING SAME

CROSS-REFERENCE TO RELATED APPLICATIONS

This application claims priority to and benefit of U.S. Patent Application Ser. No. 63/425,186, filed on Nov. 14, 2022 and U.S. Patent Application Ser. No. 63/430,258, filed on Dec. 5, 2022, each of which is hereby incorporated by reference in its entirety.

TECHNICAL FIELD

The present disclosure generally relates to a calorie-reduced chocolate product including hydrated dietary fiber and to methods for making the same, and in particular to calorie-reduced chocolate products having a significant low-viscosity water-based liquid component.

BACKGROUND

In solid chocolate manufacturing, water and chocolate do not mix. A single tablespoon (15 ml) of water will suffice to seize, split, and/or clump one kilogram of melted chocolate, rendering it useless for the formation of solid chocolate products.

Conventional pure chocolate typically exists in the form of a dispersion that consists of solids distributed in a fatty, or continuous, phase. The chocolate contains microscopic cocoa particles of an average diameter of 16 μm and sugar particles that when properly distributed are too small for our taste buds to detect any prevailing graininess. The sugar is hydrophilic, and will not combine with the fat.

Pure solid chocolate is a relatively stable system virtually free of water. When heat is added to the chocolate it melts and the stable dispersion is disrupted. If a very small amount of water or steam comes into contact with the melted chocolate, the water molecules form droplets as they will not combine with the fat (just like the sugar). However, water and sugar naturally combine so that the sugar particles become wetted by the water. The result is often called "the sugar bowl effect". This effect can be demonstrated by dripping just a few drops of water into a sugar bowl and observing the lumps that form. Similarly, the small sugar particles in the chocolate become wet and cling together creating larger agglomerates. The result is known as a "split chocolate" that is an inhomogeneous mix between the sugar agglomerates and the cocoa fat. Since the sugar has gone watery they will not mix evenly and due to the predominance of sugar as a primary ingredient in chocolate, the entire mixture becomes unpleasantly clumpy and grainy. The critical amount of added water to split the mixture is as low as 1.5% by weight, or approximately ⅓ teaspoon per 100 g.

Many solid "diet chocolates" currently on the market utilize a sugar alcohol known as maltitol. Unfortunately, some people experience stomach pains and gas as maltitol can also act similar to a laxative and cause diarrhea. The severity of these side effects depends on the amount consumed and varies within the population.

A need therefore exists for improved chocolate products that have reduced calorie and/or carbohydrate contents, and methods of producing same.

SUMMARY

The present disclosure provides a calorie-reduced chocolate product including hydrated dietary fiber and to methods for making the same.

In an embodiment, the present disclosure relates to a method for preparing a calorie-reduced chocolate product, the method comprising: providing an insoluble dietary fiber component, wherein individual fibers of the insoluble dietary fiber component have an average fiber length of between about 1 μm and about 400 μm; combining the insoluble dietary fiber component with a volume of a low-viscosity water-based liquid (LVWB liquid) at a fiber:LVWB liquid ratio of between about 1:0.5 and about 1:10 on a w/w basis to provide a hydrated fiber slurry; and mixing the hydrated fiber slurry with a chocolate to form the calorie-reduced chocolate product. In an embodiment, the LVWB liquid is water.

In an embodiment of the methods herein, the step of mixing the hydrated fiber slurry with the chocolate comprises: mixing the hydrated fiber slurry with the chocolate to form a chocolate-fiber mixture; heating the chocolate-fiber mixture, with mixing, to form a heated chocolate-fiber mixture; and cooling the heated chocolate-fiber mixture to provide the calorie-reduced chocolate product. In an embodiment, the mixing is for a period of time between about 1 min and about 15 min, with alternating intervals of mixing and rest. In an embodiment, the mixing is at a rotational speed of 80 rpm or less. In an embodiment, the heating of the chocolate-fiber mixture is to a temperature of between about 40° C. and about 60° C. In an embodiment, the cooling is a rapid cooling procedure. In an embodiment, the cooling is by introducing a quantity of ice to the water bath to reduce the temperature of the heated chocolate-fiber mixture to between about 20° C. and about 25° C., and mixing.

In an embodiment of the methods herein, the hydrated fiber slurry has a viscosity of about 25,000 cP.

In an embodiment, the methods herein further comprise: heating the calorie-reduced chocolate product to a temperature of between about 30° C. and about 35° C. to provide a heated calorie-reduced chocolate product; seeding the heated calorie-reduced chocolate product with βvi-polymorph cocoa butter crystals; and cooling to between about 20° C. and about 25° C. to re-form the calorie-reduced chocolate product. In an embodiment, the seeding of the heated calorie-reduced chocolate product with the βvi-polymorph cocoa butter crystals is at about 1.0% by weight.

In an embodiment of the methods and products of the present disclosure, the chocolate is a dark chocolate, a milk chocolate, white chocolate, rose chocolate, or any combination thereof.

In an embodiment of the methods and products of the present disclosure, the average fiber length of the individual fibers of the insoluble dietary fiber component is between about 30 μm and about 120 μm, and more particularly between about 60 μm and about 90 μm. In an embodiment, the average fiber length is about 75 μm.

In an embodiment of the methods and products herein, the fiber:LVWB liquid ratio of the hydrated fiber slurry is between about 1:2 and about 1:5 on a w/w basis. In an embodiment, the fiber:LVWB liquid ratio is about 1:4 on a w/w basis. In an embodiment, the LVWB liquid is water.

In an embodiment of the methods herein, mixing of the hydrated fiber slurry with the chocolate is at a ratio between about 80:20 and about 40:60 w/w of chocolate:hydrated fiber slurry. In an embodiment, the calorie-reduced chocolate product of the present disclosure is a solid chocolate at these ratios.

In an embodiment of the methods and products herein, the ratio of chocolate:hydrated fiber slurry is about 70:30 w/w, about 65:35 w/w. about 60:40 w/w, about 35:45 w/w, about 50:50 w/w, about 45:55 w/w or about 40:60 w/w.

In an embodiment of the methods and products herein, the insoluble dietary fiber is from wheat, oat, rice, bamboo, sugarcane, cocoa, apple, or orange. In a particular embodiment, the insoluble dietary fiber is from oat.

In an embodiment of the methods herein, the step of mixing the hydrated fiber slurry with the chocolate further comprises mixing in a stabilizing additive. In an embodiment, the stabilizing additive is a substituted gellan gum (HA gellan gum) or an unsubstituted gellan gum (LA gellan gum). In an embodiment, the stabilizing additive is a maltodextrin, an egg replacer, a Xanthan gum, or a gelatin. In a particular embodiment, the stabilizing additive is the gelatin.

In an embodiment, the present disclosure relates to a calorie-reduced chocolate product prepared by the methods as described herein, wherein the calorie-reduced chocolate product comprises at least 20% by weight of a low-viscosity water-based liquid (LVWB liquid). In an embodiment, the calorie-reduced chocolate product herein comprises at least 45% by weight of the LVWB liquid. In an embodiment, the calorie-reduced chocolate product of the present disclosure is a solid chocolate having up to 45% by weight of the LVWB liquid. In an embodiment, the LVWB liquid is water.

In an embodiment, the present disclosure relates to a calorie-reduced chocolate product comprising: at least 40% by weight chocolate; at least 5% by weight insoluble fiber; and at least 20% by weight of a low-viscosity water-based liquid (LVWB liquid). In an embodiment, the calorie-reduced chocolate product comprises at least 45% by weight of the LVWB liquid. In an embodiment, the LVWB liquid is water.

In an embodiment, the calorie-reduced chocolate products of the present disclosure further comprises a stabilizing additive. In an embodiment, the stabilizing additive is a substituted gellan gum (HA gellan gum), an unsubstituted gellan gum (LA gellan gum), a maltodextrin, an egg replacer, a Xanthan gum, or a gelatin.

Other aspects and embodiments of the disclosure are evident in view of the detailed description provided herein.

BRIEF DESCRIPTION OF THE DRAWINGS

Further advantages, permutations and combinations of the invention will now appear from the above and from the following detailed description of the various particular embodiments of the invention taken together with the accompanying drawings, each of which are intended to be non limiting, in which.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the suitable methods and materials are described below.

The retail global chocolate market is set to exceed US$1.2 Trillion per year by the end of 2023. That equates to US$150 for every person on Earth, making it one of the greatest expenditures as compared to any other food product. The current "diet chocolate" market is a tiny fraction (about 1%) of this total due to the limitations inherent in the existing forms of this product.

Many solid "diet chocolates" currently on the market utilize a sugar alcohol known as maltitol. Unfortunately, some people experience stomach pains and gas as maltitol can also act similar to a laxative and cause diarrhea. The severity of these side effects depends on the amount consumed and varies within the population. Regardless, this ingredient in most dark "diet chocolate" formulations manage to decrease the average calories per 100 g from 546 to approximately 450. This is about a 17% reduction in calories.

Advantageously, the products and methods of the present disclosure provide an improved "diet chocolate" with certain embodiments having greater reductions in calories, as well as favourable properties for use (e.g. cooking) or direct consumption of the chocolate.

In embodiments herein, the disclosed methods allow for the integration of a large volume of low-viscosity water-based liquid (LVWB liquid), such as water, in a chocolate product that maintains most of the hardness, brittleness, and various organoleptic characteristics of the original chocolate, while significantly reducing calories and carbohydrates.

Embodiments of the products and methods of the present disclosure employ a short micron-length purified food grade dietary fiber, which is extensively hydrated to form a paste/slurry that is capable of being utilized to displace a significant proportion of the original chocolate (e.g. up to 60% or more). In exemplary applications, and without limitation, the methods herein hydrate the dietary fiber at an average of 1:3.8 fiber/LVWB liquid ratio. This paste/slurry is capable of then being combined with chocolate according to the disclosure herein to provide a calorie-reduced chocolate product having improved properties.

In an embodiment, the present disclosure relates to a method for preparing a calorie-reduced chocolate product, the method comprising: providing an insoluble dietary fiber component, wherein individual fibers of the insoluble dietary fiber component have an average fiber length of between about 1 μm and about 400 μm; combining the insoluble dietary fiber component with a volume of water at a fiber:LVWB liquid ratio of between about 1:0.5 and about 1:10 on a w/w basis to provide a hydrated fiber slurry; and mixing the hydrated fiber slurry with a chocolate to form the calorie-reduced chocolate product. In an embodiment, the LVWB liquid is water.

In an embodiment of the methods and products herein, the calorie-reduced chocolate product is a solid chocolate.

As used herein, by "calorie-reduced" it is intended to mean that the chocolate product of the present disclosure has a lower amount of calories in a specific weight of product (e.g. 100 g) than an equivalent amount of the original chocolate that is used to make the chocolate products herein. Although the products and methods herein refer to "calorie-reduced chocolate products", it will be appreciated that in embodiments of the products and methods herein, carbohydrate reductions are substantially identical to the calorie reduction.

As used herein, the term "insoluble dietary fiber component" refers to a group of dietary fiber components which cannot be broken down by monogastric mammalian digestive enzymes. Dietary fiber is primarily comprised of a non-carbohydrate component called lignin and non-cellulosic polysaccharides, such as pectin substances and hemicelluloses. The structural components are found primarily in the cell wall of plants. Exemplary insoluble dietary fiber components include waxes, lignins and polysaccharides such as β-glucans, cellulose, hemicelluloses, hexoses, pentoses, lignins, and water-insoluble plant-derived starches such as high-amylose corn starch, high-amylase barley starches, and the like. Analogous insoluble non-plant starches include methylcellulose, carboxymethyl cellulose, sodium carboxymethyl cellulose, chitin, and the like. Insoluble dietary fiber components may also be referred to as "water-insoluble" dietary fiber components. Dietary fiber is highly hygroscopic, thus can absorb significant amounts of water.

Any suitable insoluble dietary fiber may be used in the methods and calorie-reduced chocolate products herein. In an embodiment, the insoluble dietary fiber is a purified food-grade dietary fiber. In an embodiment, the insoluble dietary fiber is from whole-grain products, fruits, vegetables (e.g. root vegetables, celery, and cucumbers), legumes (e.g. beans, peas, etc.), nuts, and seeds. In an embodiment, the insoluble dietary fiber is from a non-plant source. In an embodiment, and without limitation, the insoluble dietary fiber is from wheat, oat, rice, bamboo, cocoa, sugarcane, apple, or orange. In a particular embodiment, the insoluble dietary fiber is from oat or bamboo. There are a significantly larger number of plant source fibres all of which are structurally similar and may be used in the context of the present disclosure.

In an embodiment, the insoluble dietary fiber component used in the methods and products of the present disclosure comprise fibre particles that have been flattened and elongated to a ribbon-type structural arrangement. In an embodiment, the flattened and elongated fibers have a width:length ratio of between about 1:5 to about 1:20, with overall lengths as specified elsewhere herein.

The methods herein involve a step of providing an insoluble dietary fiber component. In an embodiment, the step of providing an insoluble dietary fiber component comprises obtaining the insoluble dietary fiber component from a source in which the individual fibers have already been milled to an average fiber length of between about 1 μm and about 400 μm. The skilled person will appreciate that various sources exist of insoluble dietary fibers having average fiber lengths within this size range. For example, and without limitation, Interfiber, Sp. (Lipka, Poland), is one of the world's largest fiber providers. Another supplier is Rettenmeier (Wilburgstetten, Germany).

Non-limiting examples of insoluble dietary fibers having the requisite fiber length include: Interfiber™ Unicell Oat Fiber 30 oat fiber (OF30); Interfiber™ Unicell Oat Fiber oat fiber (OF90); JRS VITACEL™ OAT240-58 oat fiber (OA240); JRS VITACEL™ BAF40 bamboo fiber (BA40); and Interfiber™ Unicell Wheat Fiber 75 wheat fiber (WF75).

In an embodiment, the insoluble dietary fiber component of the present disclosure includes a single type of insoluble dietary fibers. In other embodiments, the insoluble dietary fiber component of the present disclosure includes multiple different types of insoluble dietary fibers, including for example a mixture of any of those described herein.

In other embodiments of the methods herein, the step of providing an insoluble dietary fiber component comprises one or more steps of processing the insoluble dietary fibers to obtain an average fiber length of between about 1 μm and about 400 μm. For example, the processing steps may include providing the insoluble dietary fiber component to a wet bath; and then dry milling the insoluble dietary fiber component to produce individual fibers having the average fiber length of between about 1 μm and about 400 μm.

The fiber lengths disclosed herein have been found to be advantageous for the fiber hydration process and the production of the calorie-reduced chocolate products of the present disclosure. As set forth herein, the average fiber length is between about 1 μm and about 400 μm. In an embodiment, the fiber length is between about 10 μm and about 400 μm. In an embodiment, the fiber length is between about 10 μm and about 250 μm. In an embodiment, the fiber length is between about 30 μm and about 120 μm, more particularly between about 30 μm and about 100 μm, and more particularly still between about 60 μm and about 90 μm. In an embodiment, the average fiber length is about 30 μm, about 35 μm, about 40 μm, about 45 μm, about 50 μm, about 55 μm, about 60 μm, about 65 μm, about 70 μm, about 75 μm, about 80 μm, about 85 μm, about 90 μm, about 95 μm, or about 100 μm. In an embodiment, the average fiber length is about 75 μm.

As used herein, the term "low-viscosity water-based liquid" or "LVWB liquid" refers to any liquid having water as the solvent or continuous phase of the liquid and which has a low-viscosity. By "low viscosity" it is intended to mean a viscosity similar to that of water (e.g. around 1 mPa·s or 0.01 poise @ 20° C.) or slightly less or more viscous. For example, in an embodiment and without limitation, the viscosity of the LVWB liquid is between about 0.5 mPa·s and about 20 mPa·s at about 20° C. In an embodiment, the viscosity of the LVWB liquid is between about 1 mPa·s and about 15 mPa·s at about 20° C. In an embodiment, the viscosity of the LVWB liquid is between about 1 mPa·s and about 10 mPa·s at about 20° C. In an embodiment, the LVWB liquid is a food-grade liquid. Without limitation, examples of LVWB liquids include water (e.g. distilled, tap, sparkling, spring, mineral, flavored, purified, or infused water), fruit juices (e.g. apple, orange, grape, grapefruit, watermelon, berry, mango, pineapple, cranberry, coconut, lemon, cantaloupe, papaya, etc.), sports drinks, tea, or coconut water. In an embodiment, the LVWB liquid is water.

The methods herein involve a step of combining the insoluble dietary fiber component with a volume of a LVWB liquid at a fiber:LVWB liquid ratio of between about 1:0.5 and about 1:10 on a w/w basis to provide a hydrated fiber slurry. The combining may be by any suitable means to provide, including for example mixing, stirring, blending, agitation, letting the insoluble dietary fiber to sit, or any other like technique to obtain a hydrated slurry. In an embodiment, the step of combining the insoluble dietary fiber component with a volume of LVWB liquid is performed at a relatively low rotational speed of rpm or less. Rotation speeds above 90 rpm may induce shearing and should generally be avoided at this stage in the process. In an embodiment of the methods herein, the hydrated fiber slurry has a viscosity of between about 1,000 cP and 1 billion cP. In an embodiment of the methods herein, the hydrated fiber slurry has a viscosity of about cP. In an embodiment, the viscosity may be measured on a viscometer, rheometer or plastometer.

In an embodiment, the combining step is performed at a fiber:LVWB liquid ratio of between about 1:0.5 and about 1:10 on a w/w basis. In a particular embodiment, the combining step is performed at a fiber:LVWB liquid ratio of between about 1:1 and about 1:10 on a w/w basis. In a more particular embodiment, the combining step is performed at a fiber:LVWB liquid ratio of between about 1:2 and about 1:5 on a w/w basis. In an embodiment, the combining step is performed at a fiber:LVWB liquid ratio of about 1:0.5, about 1:1, about 1:1.5, about 1:2, about 1:2.5, about 1:3, about 1:3.5, about 1:4, about 1:4.5, about 1:5, about 1:5.5, about 1:6, about 1:6.5, about 1:7, about 1:7.5, about 1:8, about 1:8.5, about 1:9, about 1:9.5, or about 1:10 on a w/w basis. In an embodiment, the combining step is performed at a fiber:LVWB liquid ratio of about 1:4 on a w/w basis. In an embodiment, the LVWB liquid is water.

Dry insoluble dietary fibers tend to be more than 99% insoluble in the human GI tract and thus have a nutritional value of about 2 calories and 0.7 carbs per 100 g. In an embodiment, the hydrated fiber slurry of the present disclosure averages about 0.4 calories and about 0.15 carbs per 100 g.

The methods herein involve a step of mixing the hydrated fiber slurry with a chocolate to form the calorie-reduced chocolate product. The chocolate may be any type of chocolate. In an embodiment, the chocolate is a dark chocolate, a milk chocolate, a ruby chocolate, a rose chocolate, a white chocolate, or any combination thereof. The chocolate may be a sweet chocolate, a semisweet chocolate, a bittersweet chocolate, or an unsweetened chocolate. The mixing may be by any suitable means.

In an embodiment of the methods herein, the step of mixing the hydrated fiber slurry with the chocolate comprises: mixing the hydrated fiber slurry with the chocolate to form a chocolate-fiber mixture; heating the chocolate-fiber mixture, with mixing, to form a heated chocolate-fiber mixture; and cooling the heated chocolate-fiber mixture to provide the calorie-reduced chocolate product.

In select embodiments, the initial mixing step (before heating) is performed for a period of time sufficient to allow the hydrated fiber slurry and the chocolate to form a homogenous mixture, or at least as homogeneous of a mixture as reasonably possible. Preferably, the mixing at this stage is also a gentle mixing, such as at 80 rpm or less.

After the initial mixing, the chocolate-fiber mixture is heated. In select embodiments, the heating is performed with mixing to provide shear. An exemplary period of time for the heating/mixing is for a period of time between about 1 min and about 15 min. However, the heating/mixing may be for shorter or longer periods of time. In embodiment, during the heating the mixing is only performed at certain intervals, for example with alternating intervals of mixing and rest. In an embodiment, the alternating intervals or cycles or mixing and rest may be 1 min of mixing followed by 1 min of rest, which may be repeated any number of times.

In regard to temperature during the heating, in an embodiment the heating of the chocolate-fiber mixture is to a temperature of between about 40° C. and about 60° C., more particularly between about 40° C. and about 50° C., and more particularly still between about 45° C. and about 50° C. In an embodiment, the temperate is about 45-46° C. These temperatures may be particularly well suited for dark chocolate and the skilled person will appreciate that different temperatures may be appropriate for different types of chocolate. For example, the temperatures for milk chocolate may be lower.

The step of cooling may be by any suitable means. In an embodiment, the cooling is a rapid cooling procedure. In an embodiment, the cooling is by introducing a quantity of ice to the water bath to reduce the temperature of the heated chocolate-fiber mixture to between about 20° C. and about 25° C., and mixing. The quantity of ice may be a premeasured quantity to bring the heated chocolate-fiber mixture down to the desired temperature. Similar to the step of heating described above, to provide shearing the cooling may be performed with mixing. In an embodiment, the mixing may likewise be by alternating intervals or cycles, for example one minute on followed by one minute off. In an embodiment, the mixing during cooling is performed for a period of 1 min to 10 min, more particularly for about 5 min.

The step of mixing the hydrated fiber slurry with chocolate to form the calorie-reduced chocolate product may be performed at different ratios or amounts of each of the components. As will be appreciated, when increased amounts of the hydrated fiber slurry are used, more chocolate is displaced (or substituted).

In the methods herein, various different amounts of the hydrated fiber slurry may be mixed with the chocolate. In an embodiment, hydrated fiber slurry may be mixed with the chocolate in an amount of about 1% to about 80% by weight of the final product, more particularly between about 1% and about 60% by weight of the final product.

In an embodiment of the methods herein, mixing of the hydrated fiber slurry with the chocolate is at a ratio between about 80:20 w/w and about 40:60 w/w of chocolate:hydrated fiber slurry. Put another way, at one end of the spectrum the calorie-reduced chocolate products of the present disclosure would comprise about 80% chocolate and 20% hydrated fiber slurry by weight, whereas at the other end of the spectrum the calorie-reduced chocolate products of the present disclosure would comprise about 40% chocolate and 60% hydrated fiber slurry by weight.

In select embodiments of the methods and products herein, the ratio of chocolate:hydrated fiber slurry is about 70:30 w/w, about 65:35 w/w. about 60:40 w/w, about 35:45 w/w, about 50:50 w/w, about 45:55 w/w or about 40:60 w/w. These products are referred to herein as: C70/F30, C65/F35, C60/F40, C55/F45, C50/F50, C45/F55 and C40/F60, respectively.

Table 1 below provides the nutritional analysis of 100 g of a conventional dark chocolate ("Conventional") and an exemplary depiction of the reduction in various ingredients, including calories and carbohydrates, in 100 g of C70/F30, C65/F35, C60/F40, C55/F45, C50/F50, C45/F55 and C40/F60 calorie-reduced products of the present disclosure:

TABLE 1

| Ingredient Reduction | | | | | | | | |
|---|---|---|---|---|---|---|---|---|
| | Conventional | C70/F30 | C65/F35 | C60/F40 | C55/F45 | C50/F50 | C45/F55 | C40/F60 |
| Calories | 546.0 | 382.2 | 354.9 | 327.6 | 300.3 | 273.0 | 245.7 | 218.4 |
| Total Fat g | 31.0 | 21.7 | 20.2 | 18.6 | 17.1 | 15.5 | 14.0 | 12.4 |
| Saturated fat g | 19.0 | 13.3 | 12.4 | 11.4 | 10.5 | 9.5 | 8.6 | 7.6 |
| Cholesterol mg | 8.0 | 5.6 | 5.2 | 4.8 | 4.4 | 4.0 | 3.6 | 3.2 |
| Sodium mg | 24.0 | 16.8 | 15.6 | 14.4 | 13.2 | 12.0 | 10.8 | 9.6 |
| Potassium mg | 559.0 | 391.3 | 363.4 | 335.4 | 307.5 | 279.5 | 251.6 | 223.6 |
| Fiber (1:3 Fiber/water) g | 11.0 | 13.7 | 14.2 | 14.6 | 15.1 | 15.5 | 16.0 | 16.4 |
| Fiber (1:4 Fiber/water) g | 11.0 | 15.2 | 15.9 | 16.6 | 17.3 | 18.0 | 18.7 | 19.4 |
| Total Carbohydrate g | 61.0 | 42.7 | 39.7 | 36.6 | 33.6 | 30.5 | 27.5 | 24.4 |
| Sugar g | 48.0 | 33.6 | 31.2 | 28.8 | 26.4 | 24.0 | 21.6 | 19.2 |
| Protein g | 4.9 | 3.4 | 3.2 | 2.9 | 2.7 | 2.5 | 2.2 | 2.0 |
| Caffeine mg | 43.0 | 30.1 | 28.0 | 25.8 | 23.7 | 21.5 | 19.4 | 17.2 |
| Iron mg | 12.0 | 8.4 | 7.8 | 7.2 | 6.6 | 6.0 | 5.4 | 4.8 |
| Magnesium mg | 230.0 | 161.0 | 149.5 | 138.0 | 126.5 | 115.0 | 103.5 | 92.0 |
| Zinc mg | 3.3 | 2.3 | 2.1 | 2.0 | 1.8 | 1.7 | 1.5 | 1.3 |

As shown above in Table 1, not all ingredients diminish in series with the calorie and carbohydrate reduction. Fiber content actually increases to nearly twice in the maximum reduction product. In Table 1, the exemplary amount of fiber is shown for both: (1) a calorie-reduced chocolate product of the present disclosure made with a hydrated fiber slurry having a 1:3 ratio of insoluble dietary fiber component to water; and (2) a calorie-reduced chocolate product of the present disclosure made with a hydrated fiber slurry having a 1:4 ratio of insoluble dietary fiber component to water. Aside from the fiber, all the other ingredients diminish as the reduction in chocolate increases. This is generally a positive characteristic, specifically in the calories, carbohydrates, fats, sugars, etc. However, a reduction in other ingredients (e.g. nutrients) may be considered a negative.

Thus, in an embodiment, the methods herein may further comprise a step of supplementing back in one or more ingredients of the original chocolate, such as for example caffeine, minerals or other nutrients. As an example, conventional dark chocolate contains 43 mg of caffeine. This ingredient, plus protein and certain trace minerals may easily be added back in during the methods herein as shown in the "Added" column in Table 2 below to arrive at a supplemented C40/F60 product ("Supplement" column), based on 100 g weight:

TABLE 2

| Ingredient Supplementation | | | | |
|---|---|---|---|---|
| | Conventional | C40/F60: | Supplement | Added |
| Calories | 546.0 | 218.4 | 218.4 | |
| Total Fat g | 31.0 | 12.4 | 12.4 | |
| Saturated fat g | 19.0 | 7.6 | 7.6 | |
| Cholesterol mg | 8.0 | 3.2 | 3.2 | |
| Sodium mg | 24.0 | 9.6 | 9.6 | |
| Potassium mg | 559.0 | 223.6 | 559.0 | 335.4 |
| Fiber (1:3 Fiber/water) g | 11.0 | 16.4 | 16.4 | |
| Fiber (1:4 Fiber/water) g | 11.0 | 19.4 | 19.4 | |
| Total Carbohydrate g | 61.0 | 24.4 | 24.4 | |
| Sugar g | 48.0 | 19.2 | 19.2 | |
| Protein g | 4.9 | 2.0 | 4.9 | 2.9 |
| Caffeine mg | 43.0 | 17.2 | 43.0 | 25.8 |
| Iron mg | 12.0 | 4.8 | 12.0 | 7.2 |
| Magnesium mg | 230.0 | 92.0 | 230.0 | 138.0 |
| Zinc mg | 3.3 | 1.3 | 3.3 | 2.0 |

The supplemented C40/F60 product shown in Table 2 is considerably lower in the negative aspects of chocolate consumption (e.g. calories), yet has the same level of certain desirable ingredients (e.g. minerals), and could be supplemented to have even more.

Thus, in an embodiment of the methods herein, the step of mixing the hydrated fiber slurry with the chocolate further comprises mixing in a nutrient or mineral supplement. In an embodiment, the nutrient or mineral supplement is potassium, a protein, caffeine, iron, magnesium, zinc, or any combination thereof. In a particular embodiment, the nutrient or mineral supplement comprises a combination of potassium, protein, caffeine, iron, magnesium, and zinc.

The methods herein may further comprise one or more additional steps to refine or modify the calorie-reduced chocolate products described herein. For example, in an embodiment, the methods herein further comprise: heating the calorie-reduced chocolate product to a temperature of between about 30° C. and about 35° C. to provide a heated calorie-reduced chocolate product; seeding the heated calorie-reduced chocolate product with βvi-polymorph cocoa butter crystals; and cooling to between about 20° C. and about 25° C. to re-form the calorie-reduced chocolate product.

In an embodiment, the seeding of the heated calorie-reduced chocolate product with the βvi-polymorph cocoa butter crystals is by preparing silk and stirring the silk into the calorie-reduced chocolate product of the present disclosure. For example, in an embodiment, cocoa butter crystals may be warmed to 34.0° C. in the presence of βvi polymorph cocoa butter crystals provide a product known as silk. The warmed silk may then be stirred into the warmed calorie-reduced chocolate product to provide the modified calorie-reduced chocolate product. In an embodiment, the silk is added to the calorie-reduced chocolate product in an amount of between about 0.01% and about 2.5% by total weight of the product. In an embodiment, the silk is added to the calorie-reduced chocolate product in an amount of between about 0.1% and about 1.5% by total weight of the product. In an embodiment, the silk is added to the calorie-reduced chocolate product in an amount of about 1% by total weight of the product. The stirring of the silk with the calorie-reduced chocolate product may be for any amount of time required to ensure the silk has melted into the chocolate product. In an embodiment, for about 15 seconds.

While these method steps are described as being performed with βvi-polymorph cocoa butter crystals, it will be appreciated that the polymorph of the cocoa butter crystals may be any one of the six polymorphs of chocolate.

In an embodiment of the methods herein, the step of mixing the hydrated fiber slurry with the chocolate further comprises mixing in a stabilizing additive. The stabilizing additive may be included, for example, to control or improve the solidity of the calorie-reduced chocolate products of the present disclosure.

In an embodiment, the stabilizing additive may be a phosphate-containing agent capable of increasing the stability and thickness of foodstuffs, e.g. by providing an emulsification effect. In an embodiment the stabilizing additive includes native starches, modified starches, and starch sweeteners. In an embodiment, the stabilizing additive may be any one or more of: Agar, Alginates, Carrageenan, Cassia, Cellulosics (CMC, MCC, MC/HPMC), Egg Replacer, Gelatin (Animal and Vegan), Gellan (HA and LA Hydrocolloids), Guar, Gum Arabic, Konjac, Locust Bean Gum (LBG), Pectin, Tara Gum, and Xanthan. These stabilizing additives may be sourced from a one or more of a variety of botanical, microbial, animal, seaweed, and synthetic sources.

In an embodiment, the stabilizing additive is a substituted gellan gum (HA gellan gum) or an unsubstituted gellan gum (LA gellan gum). In an embodiment, the stabilizing additive is a maltodextrin, an egg replacer, a Xanthan gum (Tapioca Starch), or a gelatin. In a particular embodiment, the stabilizing additive is the gelatin.

The methods described herein may be used to make numerous different calorie-reduced chocolate products. In an embodiment, the present disclosure relates to a calorie-reduced chocolate product prepared by the methods as described herein, wherein the calorie-reduced chocolate product comprises at least 20% by weight of a LVWB liquid. In an embodiment, the calorie-reduced chocolate product herein comprises at least 45% by weight of the LVWB liquid. In an embodiment, the LVWB liquid is water.

In an embodiment, the present disclosure relates to a calorie-reduced chocolate product comprising: at least 40% by weight chocolate; at least 5% by weight insoluble fiber; and at least 20% by weight of a LVWB liquid. In an embodiment, the calorie-reduced chocolate product comprises at least 45% by weight of the LVWB liquid. In an embodiment, the LVWB liquid is water.

In an embodiment, the calorie-reduced chocolate products of the present disclosure are a C70/F30, C65/F35, C60/F40, C55/F45, C50/F50, C45/F55 and C40/F60 product, as described herein. The skilled person will appreciate the alternate amounts of the hydrated fiber slurry and chocolate may be combined to prepare products having different ratios of each, aside from those specific products referenced in the preceding sentence. In an embodiment, the hydrated fiber slurry used in the calorie-reduced chocolate products is a 1:4 w/w ratio of insoluble dietary fiber to LVWB liquid. In an embodiment, the hydrated fiber slurry used in the calorie-reduced chocolate products is a 1:3 w/w ratio of insoluble dietary fiber to LVWB liquid. In an embodiment, the LVWB liquid is water.

In an embodiment, the calorie-reduced chocolate products of the present disclosure further comprise a stabilizing additive. In an embodiment, the stabilizing additive is a substituted gellan gum (HA gellan gum), an unsubstituted gellan gum (LA gellan gum), a maltodextrin, an egg replacer, a Xanthan gum, or a gelatin.

In an embodiment, the calorie-reduced chocolate products of the present disclosure further comprise a nutrient supplement. In an embodiment, the nutrient supplement comprises one of potassium, protein, caffeine, iron, magnesium, zinc, or any combination thereof.

EXAMPLES

Reference will be made herein to the following insoluble dietary fiber components: (i) OF30=Interfiber™ Unicell Oat Fiber 30 oat fiber (Interfiber, Sp., Poland), (ii) OF90=Interfiber™ Unicell Oat Fiber 90 oat fiber (Interfiber, Sp., Poland), (iii) OA240=JRS VITACEL™ OAT240-58 oat fiber (Rettenmeier Holding AG, Germany), and (iv) BA40=JRS VITACEL™ BAF40 bamboo fiber (Rettenmeier Holding AG, Germany).

Reference will also be made herein to the following chocolate: (i) Dark Chocolate=Callebaut™ Recipe No 70-30-38 Chocolate Callets™ (Barry Callebaut AG, Switzerland) and (ii) Milk Chocolate=Callebaut™ Recipe No 823 Chocolate Callets™ ("Barry Callebaut AG, Switzerland).

Example 1: Preparation of Calorie-Reduced Dark Chocolate Products with Hydrated Fiber Slurry Having a 1:4 Ratio of Insoluble Dietary Fiber Component to Water Four hydrated fiber slurries were made at a ratio of 1 part insoluble dietary fiber to 4 parts water by weight. The insoluble dietary fiber component used in each of the hydrated fiber slurries were OF90, OF30, OA240, and BA40, respectively. The hydrated fiber slurries were prepared by adding water to the insoluble dietary fiber component at the 1:4 ratio and mixing to achieve a generally homogenous hydrated fiber slurry. The OF90 fiber component has individual fibers generally ranging from 30-130 μm in length. The OF30 fiber component has individual fibers generally ranging from 15-50 μm in length. The OA240 fiber component has individual fibers generally ranging from 35-115 μm in length. The BA40 fiber component has individual fibers generally ranging from 15-60 μm in length.

Each of the hydrated fiber slurries were separately mixed with Dark Chocolate in the following amounts by weight: (i) 70% Dark Chocolate to 30% hydrated fiber slurry ("C70/F30"), (ii) 65% Dark Chocolate to 35% hydrated fiber slurry ("C65/F35"), (iii) 60% Dark Chocolate to 40% hydrated fiber slurry ("C60/F40"), (iv) 55% Dark Chocolate to 45% hydrated fiber slurry ("C55/F45"), (v) 50% Dark Chocolate to 50% hydrated fiber slurry ("C50/F50"), (vi) 45% Dark Chocolate to 55% hydrated fiber slurry ("C45/F55"), and (vii) 40% Dark Chocolate to 60% hydrated fiber slurry ("C40/F60").

The mixing of the Dark Chocolate and the hydrated fiber slurry was performed at low rotational speed (80 rpm) until generally homogenous. Generally, the Dark Chocolate and hydrated fiber slurry mixture was warmed to a temperature of about 46.1° C., sheared via a repeating cycle of 1 minute of constant mixing and 1 minute of rest, for a total period of time of about 15 minutes. Ice was then added to the sheared mixtures to rapidly cool the mixtures to a temperature of about 26.7° C. The cooled mixtures were further sheared by continuing the repeated cycle of 1 minute of constant mixing and 1 minute of rest, for a total period of time of about 5 minutes. The sheared mixtures were then warmed to a temperature of 32.2° C. to provide a calorie-reduced chocolate product.

Further development of the calorie-reduced chocolate product was achieved by seeding with cocoa butter crystals in βvi polymorph form. Generally, the calorie-reduced chocolate product was warmed to 35.0° C. Separately, cocoa butter crystals were warmed in the presence of βvi polymorph cocoa butter crystals to 34.0° C. provide a product known as "silk". The warmed silk was then stirred into the warmed calorie-reduced chocolate product at an amount of about 1% by total weight of the chocolate product for about 15 seconds (or as long as necessary to ensure the silk has melted. During the process, the temperature is held between 33.5° C. and 35° C. The calorie-reduced chocolate product was then cooled to about 21.1° C. to provide exemplary dark chocolate products of the present disclosure having differing amounts of Dark Chocolate and hydrated fiber slurry as set forth above.

Table 3 below lists the component percentages within the calorie-reduced chocolate products made using a hydrated fiber slurry having a 1:4 w/w ratio of insoluble dietary fiber to water, as produced in this example.

TABLE 3

Component Percentages (1:4 w/w ratio products)

| Calorie-Reduced Chocolate Product | Insoluble Dietary Fiber from Hydrated Slurry (% w/w) | Water from Hydrated Slurry (% w/w) | Chocolate (% w/w) |
|---|---|---|---|
| C40/F60 | 12.0 | 48.0 | 40.0 |
| C45/F55 | 11.0 | 44.0 | 45.0 |
| C50/F50 | 10.0 | 40.0 | 50.0 |
| C55/F45 | 9.0 | 36.0 | 55.0 |
| C60/F40 | 8.0 | 32.0 | 60.0 |
| C65/F35 | 7.0 | 28.0 | 65.0 |
| C70/F30 | 6.0 | 24.0 | 70.0 |

As is evident by Table 3, in this 1:4 w/w ratio, the C40/F60 calorie-reduced chocolate product of the present disclosure contains more water than it contains actual chocolate. However, even the C70/F30 contains 24% by weight water. Given that previously existing chocolate products generally could not exceed 1% water content, this amount of integration of water within chocolate is unprecedented and advantageous in the formation of a solid product. Chocolate to water percentages such as these conventionally only produce loose ganaches and similar semi-liquid chocolate products.

Example 2: Preparation of Calorie-Reduced Dark Chocolate Products with Hydrated Fiber Slurry Having a 1:3 Ratio of Insoluble Dietary Fiber Component to Water Four hydrated fiber slurries were made at a ratio of 1 part insoluble dietary fiber to 3 parts water by weight. The insoluble dietary fiber component used in each of the hydrated fiber slurries were OF90, OF30, OA240, and BA40, respectively. The hydrated fiber slurries were prepared in similar fashion as described in Example 1 for the hydrated fiber slurries having a 1:4 w/w ratio of insoluble dietary fiber to water.

Each of the hydrated fiber slurries having a 1:3 w/w ratio of insoluble dietary fiber to water were separately used to prepare calorie-reduced dark chocolate products of the present disclosure by mixing with Dark Chocolate in accordance with the procedure described in Example 1 to prepare products having the following amounts by weight: (i) 70% Dark Chocolate to 30% hydrated fiber slurry ("C70/F30"), (ii) 65% Dark Chocolate to 35% hydrated fiber slurry ("C65/F35"), (iii) 60% Dark Chocolate to 40% hydrated fiber slurry ("C60/F40"), (iv) 55% Dark Chocolate to 45% hydrated fiber slurry ("C55/F45"), (v) 50% Dark Chocolate to 50% hydrated fiber slurry ("C50/F50"), (vi) 45% Dark Chocolate to 55% hydrated fiber slurry ("C45/F55"), and (vii) 40% Dark Chocolate to 60% hydrated fiber slurry ("C40/F60").

Table 4 below lists the component percentages within the calorie-reduced chocolate products made using a hydrated fiber slurry having a 1:3 w/w ratio of insoluble dietary fiber to water, as produced in this example.

TABLE 4

Component Percentages (1:3 w/w ratio products)

| Calorie-Reduced Chocolate Product | Insoluble Dietary Fiber from Hydrated Slurry (% w/w) | Water from Hydrated Slurry (% w/w) | Chocolate (% w/w) |
|---|---|---|---|
| C40/F60 | 15.00 | 45.00 | 40.0 |
| C45/F55 | 13.75 | 41.25 | 45.0 |
| C50/F50 | 12.50 | 37.50 | 50.0 |
| C55/F45 | 11.25 | 33.75 | 55.0 |
| C60/F40 | 10.00 | 30.00 | 60.0 |
| C65/F35 | 8.75 | 26.25 | 65.0 |
| C70/F30 | 7.50 | 22.50 | 70.0 |

As is evident by Table 4, the calorie-reduced chocolate products of the present disclosure made using a 1:3 w/w ratio of insoluble dietary fiber to water have slightly less water than the products made with a 1:4 w/w ratio of insoluble dietary fiber to water. The products made with a 1:3 w/w ratio of insoluble dietary fiber to water provide an option to achieve a more solid chocolate, while still incorporating a significant quantity of water.

Example 3: Assessment of the Calorie-Reduced Dark Chocolate Products

Each of the exemplary calorie-reduced dark chocolate products of Examples 1 and 2 were assessed for various characteristics, including (i) hardness, (ii) compressibility, (iii) bend/break capacity (iv), clean mold removal capability, (v) shine, and (vi) maintenance of shape at room temperature.

The scoring parameters were as follows in Table 5 below:

TABLE 5

Scoring Parameters

| Characteristic | Scoring Parameter |
|---|---|
| Hardness | 1-10, where 1 is the softest and 10 is the hardest conventional chocolate |
| Compressibility | 1-10, where 1 is the most compressible and 10 is the most resistant to force conventional chocolate |

TABLE 5-continued

Scoring Parameters

| Characteristic | Scoring Parameter |
| --- | --- |
| Bend/Break | 2 is break, 1 is somewhat, 0 is bend |
| Clean Mold Removal | 2 is yes, 1 is somewhat, 0 is no |
| Shiny | 2 is yes, 1 is somewhat, 0 is no |
| Maintains Shape at RT | 2 is yes, 1 is somewhat, 0 is no |

In the above scoring system, the maximum score is 28. Notably, the overall score of the Callebaut Dark 70/30/38 Chocolate Callets was 26 and the Callebaut Milk Chocolate Callets was 17.

Figure 1:
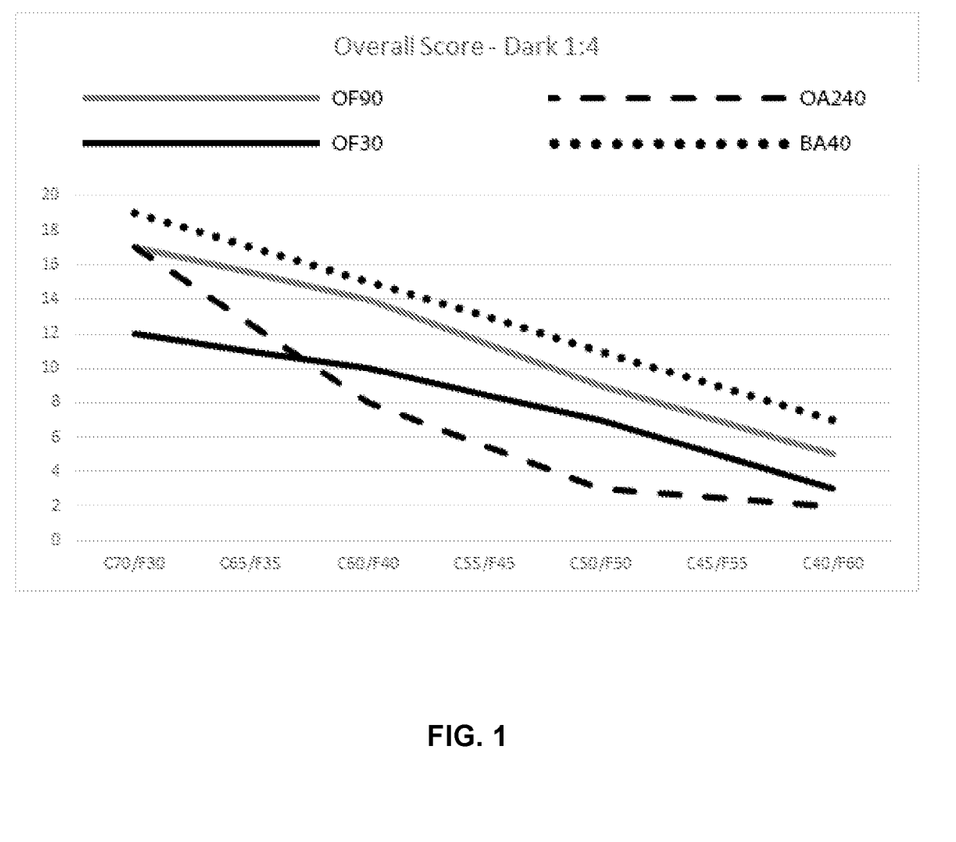
FIG. 1 is a graph illustrating the overall scoring of various calorie-reduced dark chocolate products of the present disclosure made using different hydrated fiber slurries having a 1:4 w/w ratio of insoluble dietary fiber to water.

FIG. 1 shows the overall weighted scores of the exemplary calorie-reduced dark chocolate products of Example 1. The scores varied according to average fiber length, diameter, and plant source of the dietary fiber component. It is notable that the bamboo fiber functioned in a similar manner to the oat fiber, even outscoring the OF90 very slightly, while displaying a nearly identical efficiency curve. Both bamboo and oat are effective in both gluten-containing and gluten-free preparations, and thus may be a particularly suitable insoluble dietary fiber for chocolate. The OA240 was found to work well at high chocolate percentages, displaying an even better overall score than OF30 at above 50% chocolate. At a 1:4 w/w ratio of insoluble dietary fiber to water, the hydration of the chocolate is significant as detailed in Table 3 above, while still capable of forming a solid chocolate.

Figure 2:
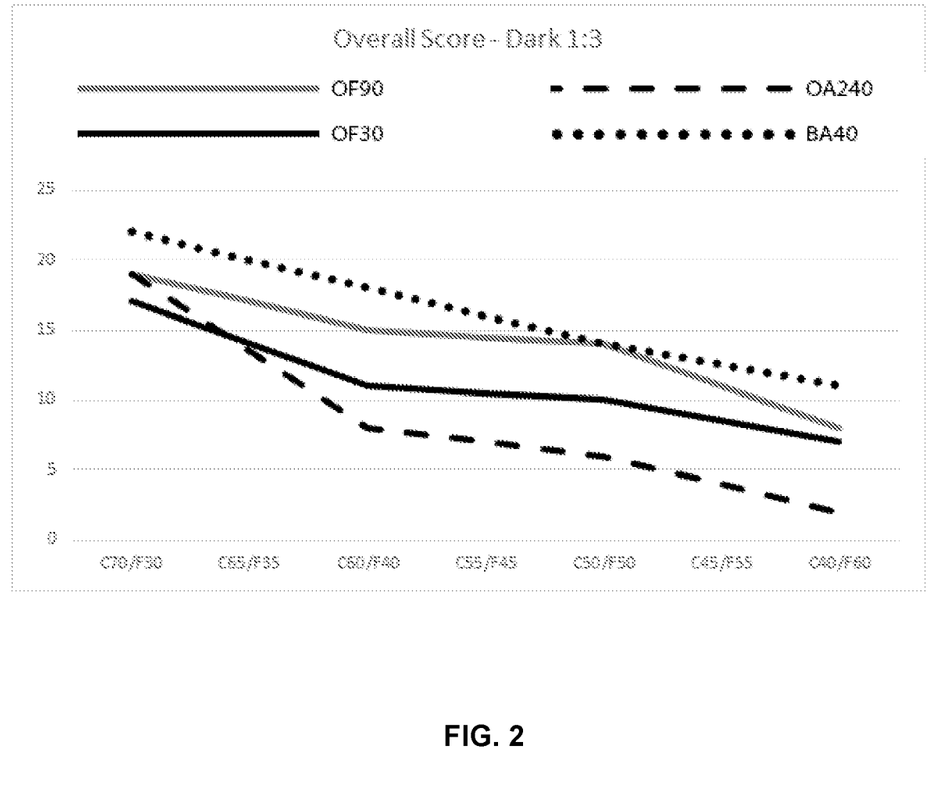
FIG. 2 is a graph illustrating the overall scoring of various calorie-reduced dark chocolate products of the present disclosure made using different hydrated fiber slurries having a 1:3 w/w ratio of insoluble dietary fiber to water.

FIG. 2 shows the overall weighted scores of the exemplary calorie-reduced dark chocolate products of Example 2. As noted above, the Callebaut Dark 70/30/38 Chocolate Callets score 26 by the described scoring system. It is notable, as shown in FIG. 2, that the calorie-reduced dark chocolate product made with BA40 insoluble dietary fiber achieves a score of 22, even though 30% of the chocolate has been displaced by the hydrated fiber slurry having a 1:3 w/w ratio of insoluble dietary fiber to water. The achievement of such a high organoleptic score in a solid chocolate product that contains 22.5% pure water is highly advantageous, for example in preparing calorie-reduced chocolate products. Moreover, at the other end of the graph, where 60% of the chocolate is displaced by the hydrated fiber slurry, the BA40 product is still able to achieve a score of 11. The oat fiber products (OF90 and OF30) were not substantially different in their overall scores as compared to BA40. Again, OA240 was found to work well at high chocolate percentages.

Figure 3:
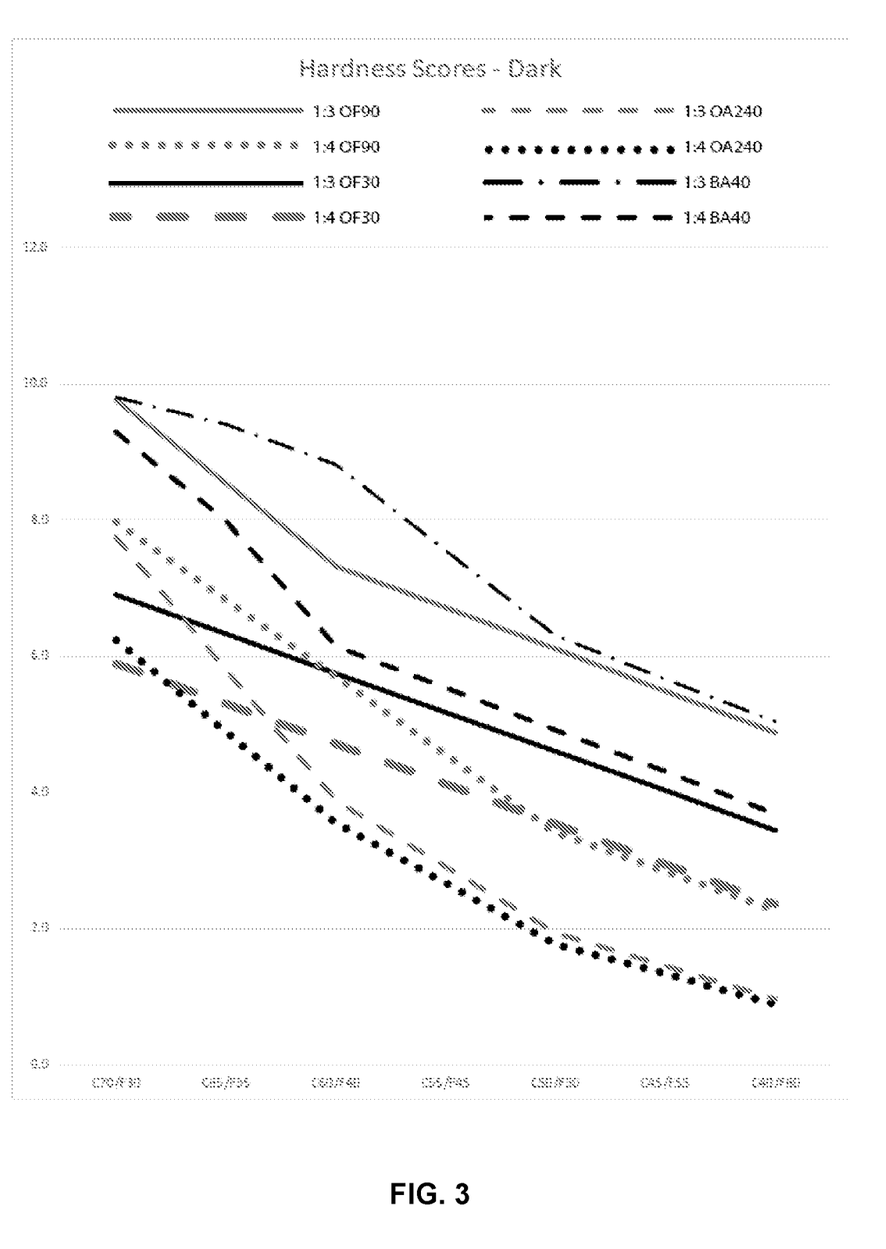
FIG. 3 is a graph illustrating the hardness scores of various calorie-reduced dark chocolate products according to some embodiments of the present disclosure.

FIG. 3 shows the overall weighted hardness scores of the exemplary calorie-reduced dark chocolate products of Examples 1 and 2. As was observed in the overall scores shown in FIGS. 1 and 2, the BA40 products were the leading fiber in sheer hardness characteristics alone, closely followed by OF90 and OF30 products at both the 1:3 w/w ratio and the 1:4 w/w ratio. At their lowest level of chocolate (C40/F60), some of the products are still scoring 5 or above and at C60/F40 all of the products except the OA240 products are scoring 5 or above. At these hardness levels, it is anticipated that the products will not require a stabilizing additive for any level above the 50/50 ratio in order to achieve a commercially acceptable hardness to meet consumer expectations.

Figure 4:
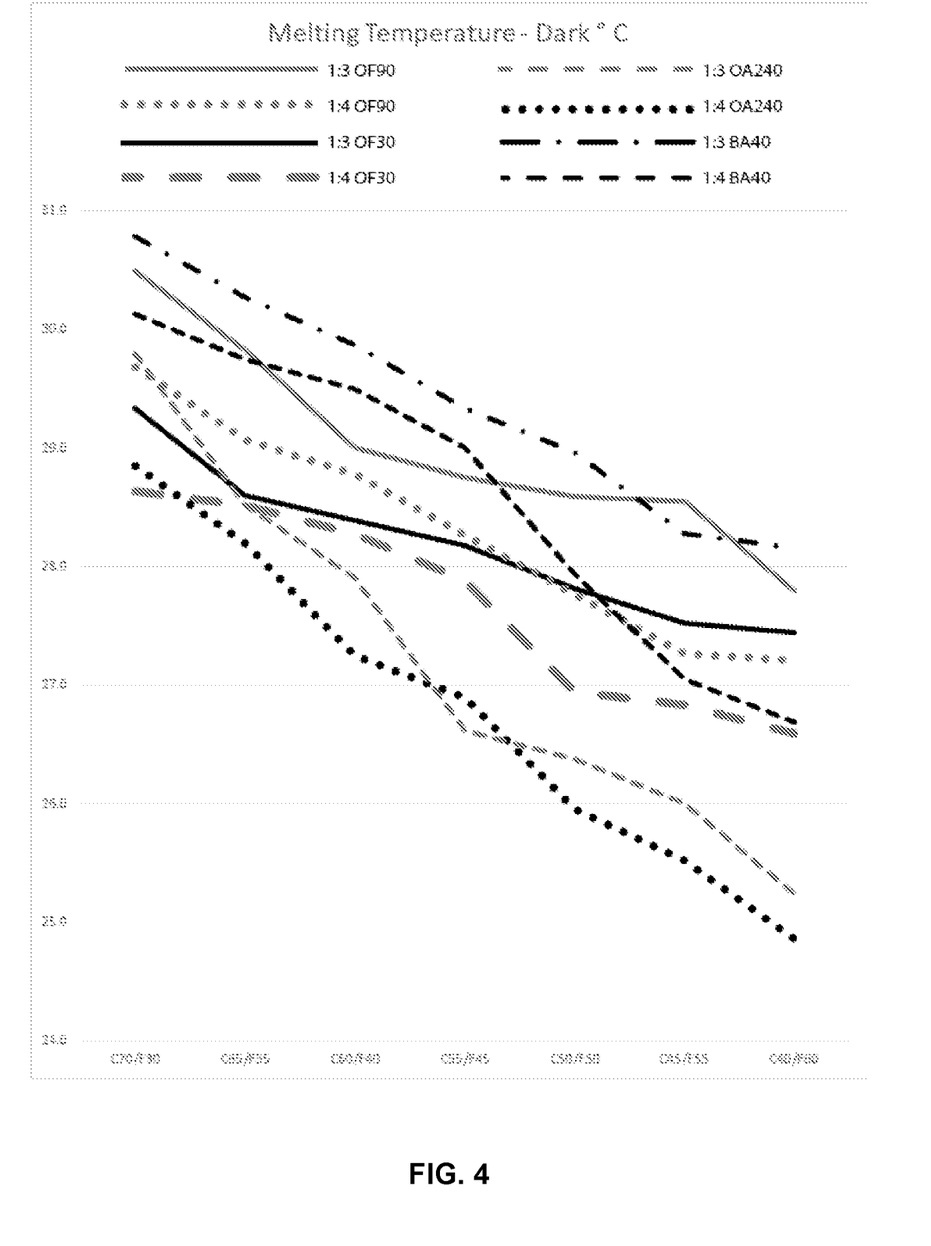
FIG. 4 is a graph illustrating melting temperature of various calorie-reduced dark chocolate products according to some embodiments of the present disclosure.

FIG. 4 shows the melting temperature of the exemplary calorie-reduced dark chocolate products of Examples 1 and 2. The graph indicates the temperature at which the product was observed to begin barely melting. Hardness of a solid chocolate at ambient temperatures is a relevant characteristic as relates to shipping, storage, and retail display. After a chocolate products begins to melt, the organoleptic properties invariably and often permanently suffer. Callebaut Dark 70/30/38 Chocolate Callets have a melting point of 33.8° C. and thus are a very stable product through the range of normal indoor ambient temperatures which range from 18.3° C. to 26.7° C. As in the case of the Hardness Scores, BA40 is also the leading fibre in highest melting point, closely followed by OF90 at both the 1:3 w/w ratio and the 1:4 w/w ratio. With both 1:3 w/w products for BA40 and OF90 melting at over 27.8° C. throughout their range of chocolate percentages, they have melting points of acceptable commercial states without the addition of any structural additives. In fact, the only product in either the 1:4 w/w or 1:3 w/w ratios to melt at temperatures below 26.7° C. were the products, and even then only at chocolate levels of less than around 55%.

Example 4: Preparation of Calorie-Reduced Milk Chocolate Products with Hydrated Fiber Slurry Having a 1:3 Ratio of Insoluble Dietary Fiber Component to Water The procedure of Example 2 was used to prepare calorie-reduced chocolate products using Milk Chocolate, instead of Dark Chocolate. The products were prepared with each of the OF90, OF30, OA240, and BA40 hydrated fiber slurries having a 1:3 w/w ratio of insoluble dietary fiber to water. Each of the hydrated fiber slurries were combined with the Milk Chocolate in similar manner to that of the Dark Chocolate in Example 2.

Example 5: Assessment of the Calorie-Reduced Milk Chocolate Products

Each of the exemplary calorie-reduced milk chocolate products of Example 4 were assessed for the same characteristics as described in Example 3 to provide an overall score.

Figure 5:
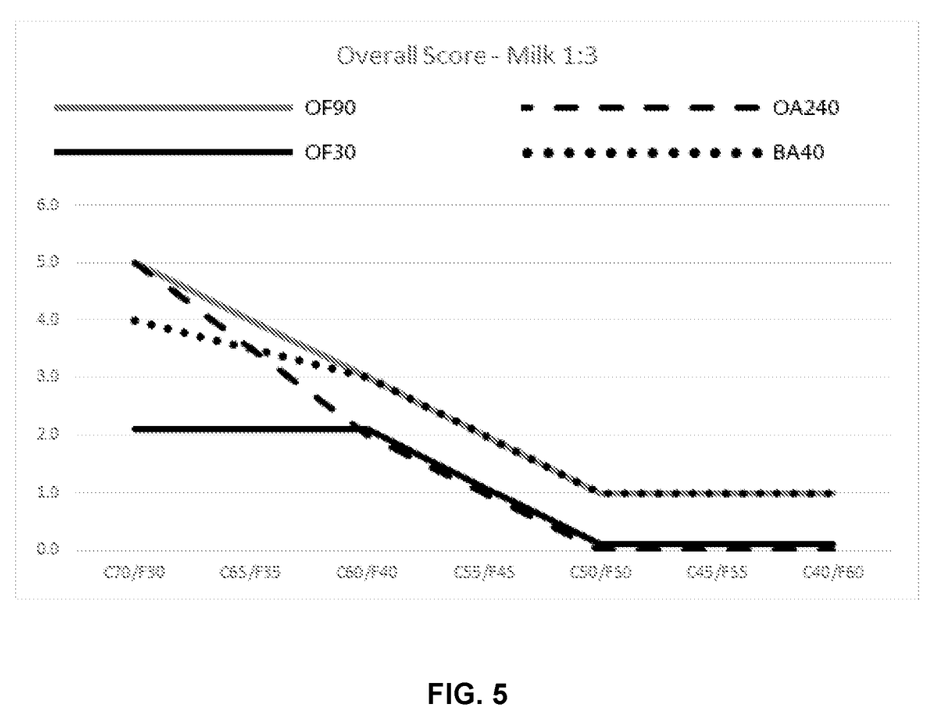
FIG. 5 is a graph illustrating the overall scoring of various calorie-reduced milk chocolate products of the present disclosure made using different hydrated fiber slurries having a 1:3 w/w ratio of insoluble dietary fiber to water.

FIG. 5 shows the overall scores of the exemplary calorie-reduced milk chocolate products of Example 4. Milk chocolate hardness at ambient temperatures is commonly a greater challenge than dark chocolate. Even at the lowest chocolate displacement percentages of 30%, the highest overall score was 5.0 for the best performing fiber in this study, OF90.

Example 6: Preparation of Calorie-Reduced Milk Chocolate Products with Hydrated Fiber Slurry Having a 1:3 Ratio of Insoluble Dietary Fiber Component to Water and a Stabilizing Additive The procedure of Example 2 was used to prepare a hydrated fiber slurry using OF90 fiber at a 1:3 w/w ratio of insoluble dietary fiber to water. Calorie-reduced chocolate products using Milk Chocolate and the OF90 hydrated fiber slurry (1:3 w/w ratio) were prepared in accordance with Example 5 (C70/F30, C65/F35, C60/F40, C55/F45, C50/F50, C45/F55, and C40/F60), with the exception that the step of combining/mixing the hydrated fiber slurry with the Milk Chocolate also included the addition of a stabilizing additive selected from (i) maltodextrin (Tapioca), (ii) Bob's Red Mill Egg Replacer (Bob's Red Mill Natural Foods; Oregon, USA), (iii) Xanthan gum, and (iv) gelatin. The stabilizing additive was added at an amount of 1% of total weight of the calorie-reduced chocolate products. Powder stabilizing agents were added in the powder form. The gelatin sheets were precut into strips of about 2 cm×10 cm.

Example 7: Assessment of the Calorie-Reduced Milk Chocolate Products Including a Stabilizing Agent Each of the exemplary calorie-reduced milk chocolate products of Example 6 were assessed for the same characteristics as described in Example 3 to provide an overall score.

Figure 6:
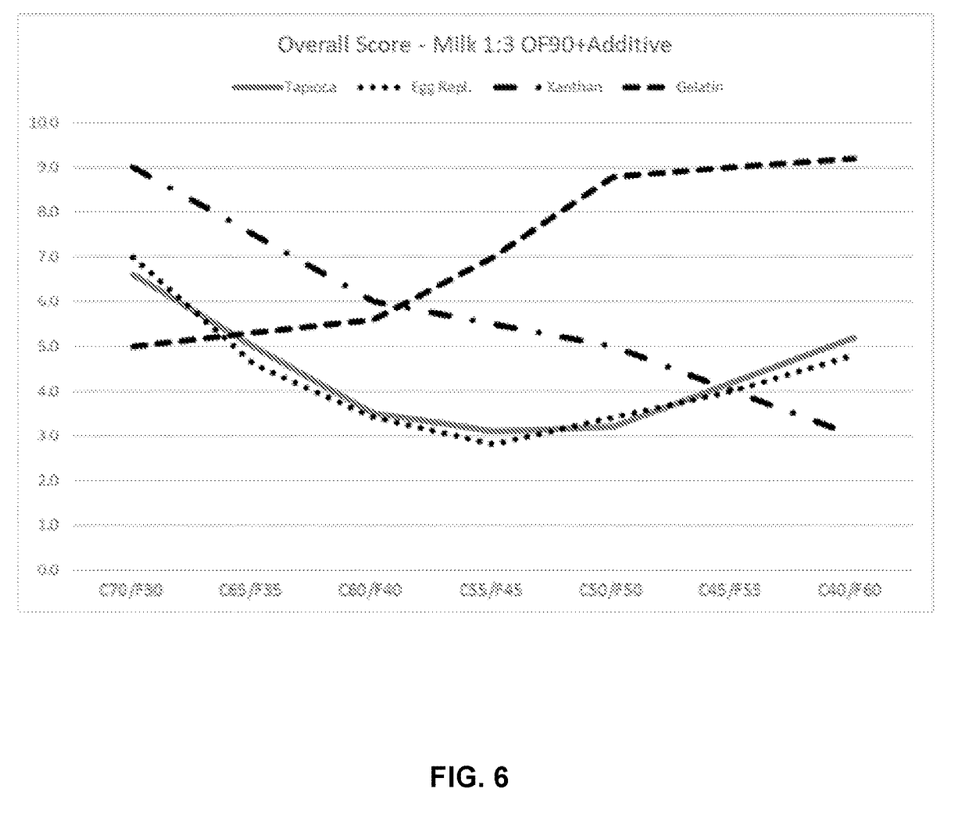
FIG. 6 is a graph illustrating the overall scoring of four calorie-reduced milk chocolate products of the present disclosure made using a hydrated fiber slurry having a 1:3 w/w ratio of OF90 insoluble dietary fiber to water, each including a different stabilizing additive (i.e. tapioca, egg replacement, Xanthan gum or gelatin).

FIG. 6 shows the overall scores of the exemplary calorie-reduced milk chocolate products of Example 6 that include a stabilizing additive. In several of the products, the structural effect of the stabilizing additive increased at a certain point while the percentage of chocolate decreased. For gelatin, the increase in score was observed continuously as the amount of chocolate decreased. In contrast, Xanthan gum showed a fairly linear decline in efficacy as chocolate amount decreased. Overall, the results demonstrate that a stabilizing additive can be used to improve overall score.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be referenced herein, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A method for preparing a calorie-reduced chocolate product, the method comprising:
   providing an insoluble dietary fiber component, wherein individual fibers of the insoluble dietary fiber component have an average fiber length of between about 1 μm and about 400 μm;
   combining the insoluble dietary fiber component with a volume of a low-viscosity water-based liquid (LVWB liquid) at a fiber:LVWB liquid ratio of between about 1:0.5 and about 1:10 on a w/w basis to provide a hydrated fiber slurry;
   mixing the hydrated fiber slurry with a chocolate and a stabilizing additive to form the calorie-reduced chocolate product;
   heating the calorie-reduced chocolate product to a temperature of between about 30° C. and about 35° C. to provide a heated calorie-reduced chocolate product;
   seeding the heated calorie-reduced chocolate product with βvi-polymorph cocoa butter crystals; and
   cooling to between about 20° C. and about 25° C. to re-form the calorie-reduced chocolate product.

2. The method of claim 1, wherein the step of mixing the hydrated fiber slurry with the chocolate comprises:
   mixing the hydrated fiber slurry with the chocolate to form a chocolate-fiber mixture;
   heating the chocolate-fiber mixture, with mixing, to form a heated chocolate-fiber mixture; and
   cooling the heated chocolate-fiber mixture to provide the calorie-reduced chocolate product.

3. The method of claim 2, wherein the mixing is for a period of time between about 1 min and about 15 min, with alternating intervals of mixing and rest.

4. The method of claim 2, wherein the mixing is at a rotational speed of 80 rpm or less.

5. The method of claim 2, wherein the heating of the chocolate-fiber mixture is to a temperate of between about 40° C. and about 60° C.

6. The method of claim 5, wherein the cooling is a rapid cooling procedure to between about 20° C. and about 25° C.

7. The method of claim 1, wherein the seeding of the heated calorie-reduced chocolate product with the βvi-polymorph cocoa butter crystals is at 1.0% by weight.

8. The method of claim 1, wherein the chocolate is a dark chocolate.

9. The method of claim 1, wherein the chocolate is a milk chocolate.

10. The method of claim 1, wherein the average fiber length of the individual fibers of the insoluble dietary fiber component is between 10 μm and about 400 μm.

11. The method of claim 1, wherein the average fiber length of the individual fibers of the insoluble dietary fiber component is between 30 μm and about 120 μm.

12. The method of claim 1, wherein the average fiber length of the individual fibers of the insoluble dietary fiber component is between about 60 μm and about 90 μm.

13. The method of claim 1, wherein the average fiber length of the individual fibers of the insoluble dietary fiber component is about 75 μm.

14. The method of claim 1, wherein the fiber:LVWB liquid ratio is between about 1:2 and about 1:5 on a w/w basis.

15. The method of claim 1, wherein the fiber:LVWB liquid ratio is about 1:4 on a w/w basis.

16. The method of claim 1, wherein the LVWB liquid is water.

17. The method of claim 1, wherein mixing of the hydrated fiber slurry with the chocolate is at a ratio between about 80:20 and about 40:60 w/w of chocolate:hydrated fiber slurry.

18. The method of claim 17, wherein the ratio of chocolate:hydrated fiber slurry is about 70:30 w/w, about 65:35 w/w, about 60:40 w/w, about 35:45 w/w, about 50:50 w/w, about w/w or about 40:60 w/w.

19. The method of claim 1, wherein the insoluble dietary fiber is from wheat, oat, rice, bamboo, sugarcane, cocoa, apple, or orange.

20. The method of claim 1, wherein the stabilizing additive is a substituted gellan gum (HA gellan gum) or an unsubstituted gellan gum (LA gellan gum).

21. The method of claim 1, wherein the stabilizing additive is a maltodextrin, an egg replacer, a Xanthan gum, or a gelatin.

* * * * *

UNITED STATES PATENT AND TRADEMARK OFFICE
CERTIFICATE OF CORRECTION

| | | |
|---|---|---|
| PATENT NO. | : 11,882,848 B1 | Page 1 of 1 |
| APPLICATION NO. | : 18/156263 | |
| DATED | : January 30, 2024 | |
| INVENTOR(S) | : Hal Pio Chouinard | |

It is certified that error appears in the above-identified patent and that said Letters Patent is hereby corrected as shown below:

On the Title Page

Column 2 Item (56) (Other Publications), Line 2, delete "(Year: 2020) (Year: 2020)." and insert -- (Year: 2020). --.

Column 2 Item (56) (Other Publications), Line 3, delete "Elelments" and insert -- Elements --.

In the Specification

Column 6, Line 8, delete "Fiber oat" and insert -- Fiber 90 oat --.

Column 7, Line 8, before "rpm" insert -- 80 --.

Column 7, Line 14, before "cP." insert -- 25,000 --.

Column 9, Line 53 (approx.), delete "C40/F60:" and insert -- C40/F60 --.

Column 12, Line 24, delete "No" and insert -- N° --.

Column 12, Line 26, delete "No" and insert -- N° --.

Column 16, Line 18 (approx.), before "products," insert -- OA240 --.

In the Claims

Column 20, Line 8 (approx.), Claim 18, delete "about w/w" and insert -- about 45:55 w/w --.

Signed and Sealed this
Twenty-fourth Day of September, 2024

Katherine Kelly Vidal
*Director of the United States Patent and Trademark Office*